No. 684,812. Patented Oct. 22, 1901.
P. HAERST.
STREET SWEEPER.
(Application filed Jan. 12, 1901.)

(No Model.) 3 Sheets—Sheet 1.

Witnesses:
G. S. Noble
I. D. McMahon

Inventor,
Pierre Haerst
By H. C. Hunsberger
Att'y.

No. 684,812. Patented Oct. 22, 1901.
P. HAERST.
STREET SWEEPER.
(Application filed Jan. 12, 1901.)
(No Model.) 3 Sheets—Sheet 2.

Witnesses:
G. S. Noble
J. D. McMahon.

Inventor,
Pierre Haerst
By H C Hunsberger
Att'y.

No. 684,812. Patented Oct. 22, 1901.
P. HAERST.
STREET SWEEPER.
(Application filed Jan. 12, 1901.)
(No Model.) 3 Sheets—Sheet 3.
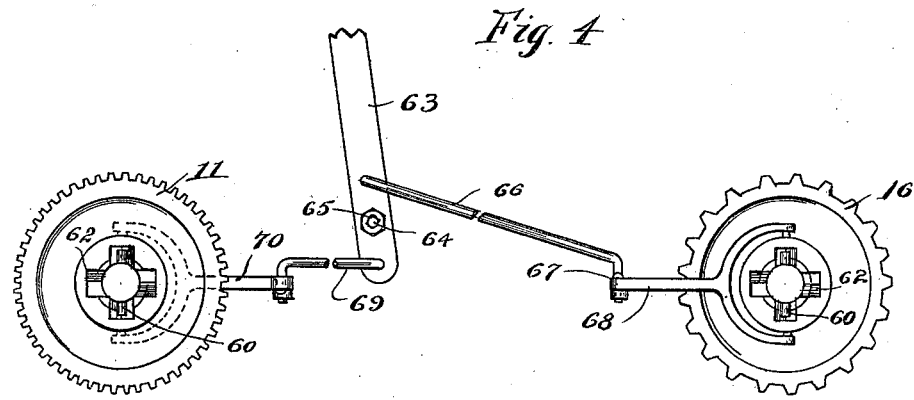
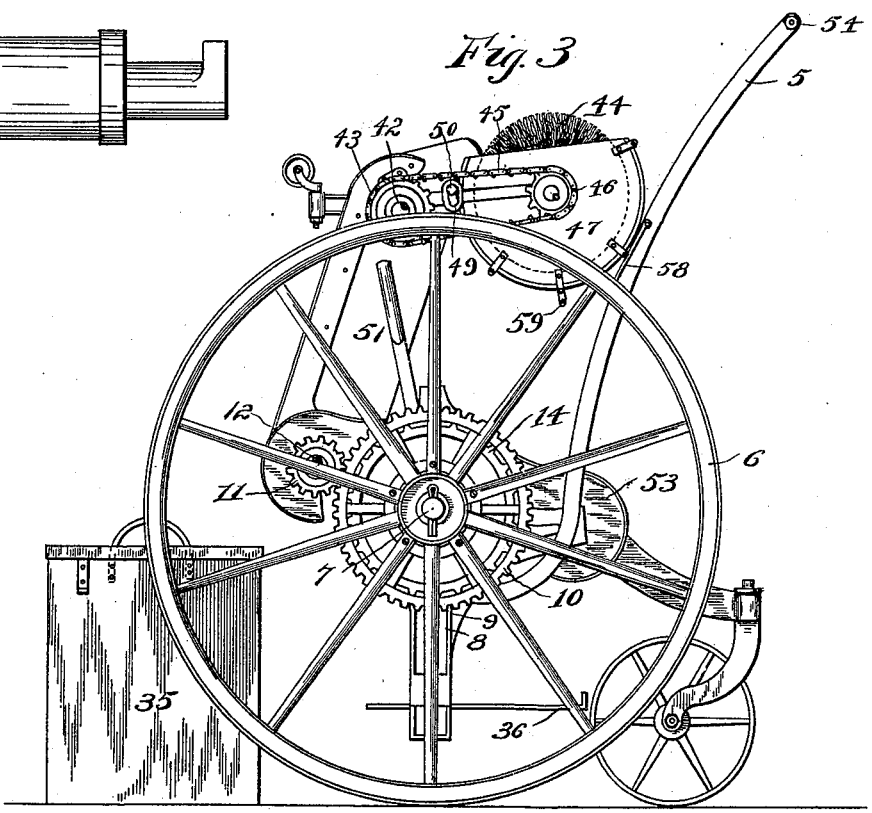
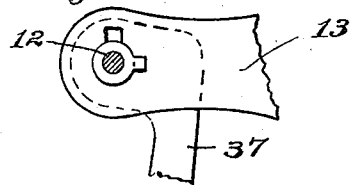
Witnesses:
J. S. Noble
J. D. McMahon.
Inventor,
Pierre Haerst
By H C Hunsberger
Att'y.

UNITED STATES PATENT OFFICE.

PIÈRRE HAERST, OF CHICAGO, ILLINOIS.

STREET-SWEEPER.

SPECIFICATION forming part of Letters Patent No. 684,812, dated October 22, 1901.

Application filed January 12, 1901. Serial No. 43,070. (No model.)

*To all whom it may concern:*

Be it known that I, PIÈRRE HAERST, a citizen of the United States, residing at Chicago, in the county of Cook and State of Illinois, have invented certain new and useful Improvements in Street-Sweepers, of which the following is a specification.

The invention relates to machines for scraping and sweeping streets, walks, floors, and the like, and more particularly to such machines as may be manually operated.

Its objects are to provide a machine for the purpose indicated that will be easy to propel, that will loosen and remove all the large and small particles of dirt, refuse, and dust, and that will be economical to manufacture and operate.

It consists, then, in combining with a properly-supported adjustable shovel a dirt-receptacle, means for elevating the dirt into said receptacle, and a suitable frame mounted on carrying-wheels, in combining with a shovel or scraper a dirt-receptacle, means for elevating the gathered dirt into said receptacle, an auxiliary sweeping-brush for collecting the dust or dirt passed over by the first device, means for elevating the dust into the aforementioned receptacle, and a suitable supporting-frame, traction-wheels, pushing-handle, gearing and transmission devices for operating the several parts from the wheels, and such other details of construction and novel elements as will be hereinafter pointed out.

Figure 1:
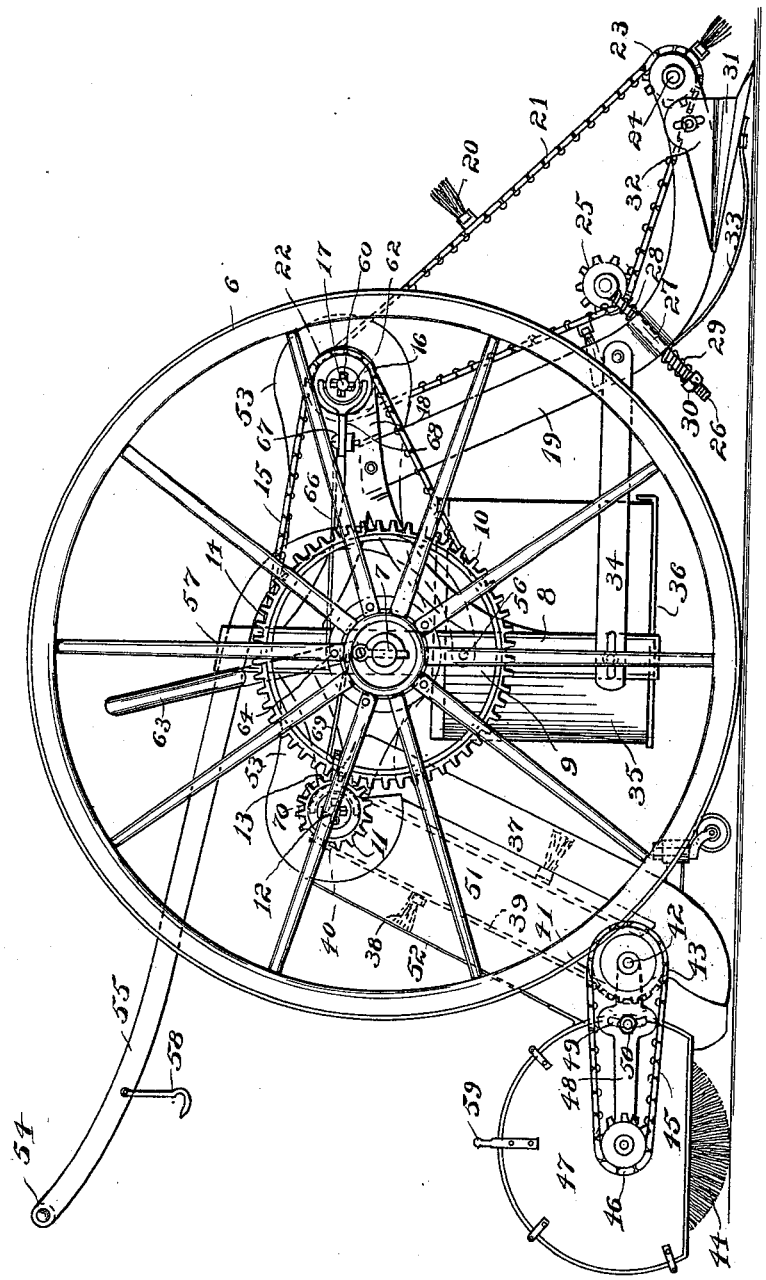
Figure 2:
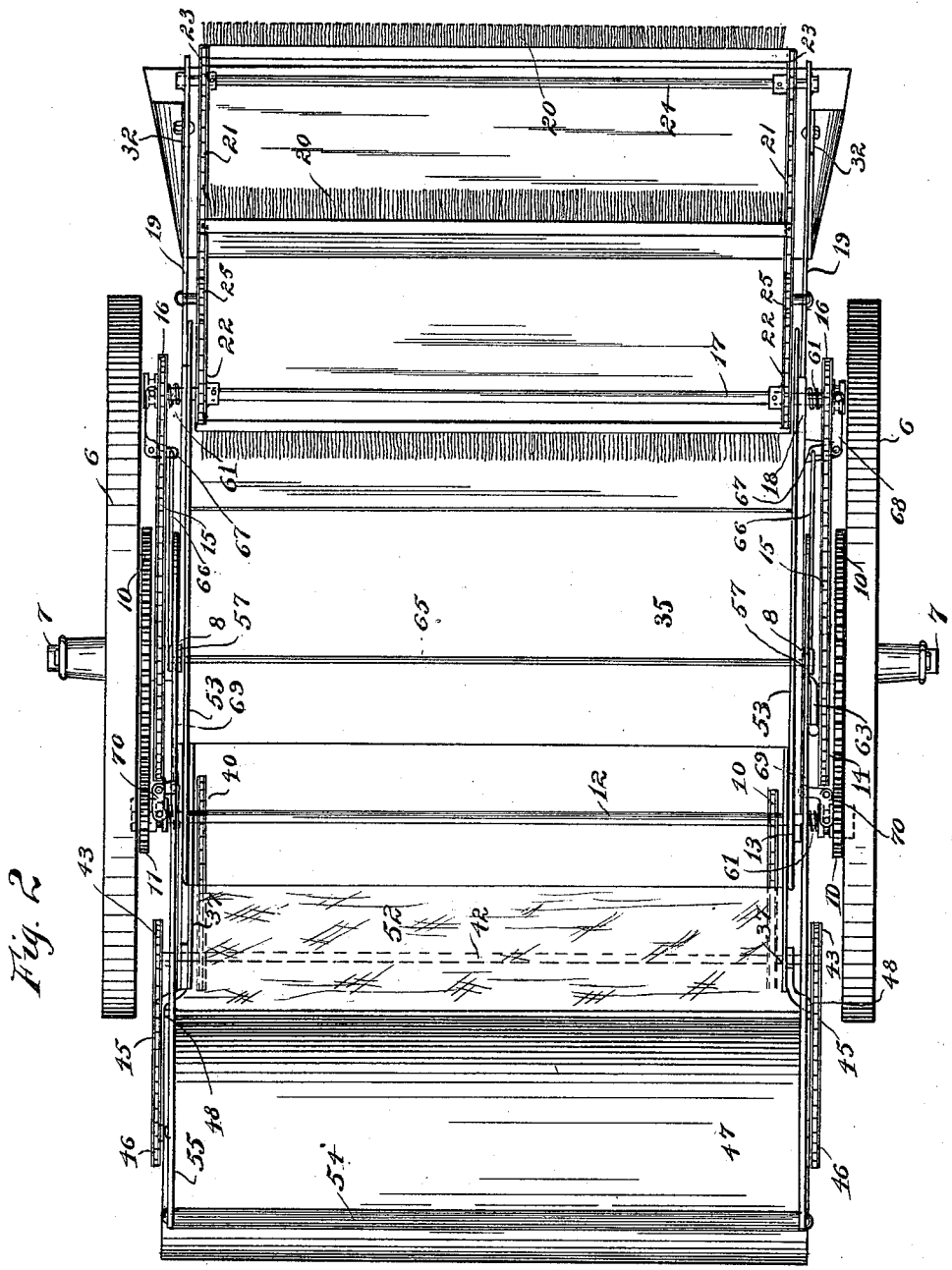

In the drawings, Figure 1 is a side elevation of a sweeper embodying my invention. Fig. 2 is a plan view of the same. Fig. 3 is a side elevation of the sweeper with one of the dirt-collecting elements removed and the other in a raised position to allow the insertion of the dirt-receptacle. Fig. 4 is a detail of the clutch-operating mechanism. Fig. 5 is a detail of the brush-trunnion. Fig. 6 is a detail.

6 6 are traction-wheels suitably mounted on trunnions 7 7, rigidly attached to the side members 8 8 of the main frame 9. Gear-wheels 10 10 are attached to the traction-wheels and are adapted to engage with clutch-pinions 11 11, mounted on a shaft 12, supported in suitable bearings in an extension 13 of the main frame. Sprocket-wheels 14 are also carried on the traction-wheels, which are connected by link belts 15 to clutch-sprockets 16, mounted on a shaft 17, also carried in bearings in an extension 18 of the main frame. The entire mechanism, consisting of the forward scraping and elevating and the rear sweeping and dust-collecting devices, is driven by these shafts.

Attached to the extension 18 of the main frame are forwardly-depending side pieces 19, provided with a suitable bottom, preferably of sheet metal, upon which the dirt is carried up by the brushes 20, secured upon link belts 21, driven by sprockets 22 on the shaft 17 and passing down over idler-sprockets 23 upon a shaft 24, mounted in the ends of the side members 19, and under tension-sprockets 25. The tension-sprockets 25 are secured in the ends of eyebolts 26, which pass through lugs 27 on the side members, and are provided with springs 28 above and springs 29 below and an adjustment-nut 30. At the lower forward ends of the side members 19 is attached the adjustable shovel or scraper 31, having upturned end pieces 32, provided with slotted holes to engage with bolts through the side members to allow for the adjustment. A spring 33 is attached to the bottom at about the center, which is adapted to form a yielding support for the shovel. Side braces 34 are attached to the side members 19 and extend back to the main frame. These are made adjustable by means of slotted holes for the bolts through the frame. As the dirt is loosened by the shovel and carried up by the elevating-brushes it is discharged into a receptacle 35, provided for that purpose. This consists of a box carried on supports 36 on the main frame, which may be readily removed for emptying.

In order that any dust or small particles passed over by the shovel will be gathered up, a sweeping and elevating device is provided at the rear of the machine, as shown. Depending side members 37 are rotatably mounted on the shaft 12 and provided with a suitable bottom, upon which the dirt is elevated. This is accomplished by brushes 38, secured to the link belts 39, passing over driving-sprockets 40 on the shaft 12 and sprockets 41 on a shaft 42, journaled in the lower ends of the side members. This shaft is extended to receive sprocket-wheels 43 at the ends, which drive the sweeping-brush 44 by means of link belts 45, running over sprockets 46, secured on the trunnions of the brush. The brush is inclosed in a casing 47. In order to allow a vertical adjustment of the brush, it is carried on brackets 48, pivoted on the shaft 42 and provided with slotted holes 49 for the bolts 50. A casing for the elevating device is made of sides 51 and canvas top 52. The side members are pivoted, as shown in Fig. 6. Casters are provided at the lower ends of the side members 37, as shown. The dirt and dust gathered are discharged into the above-mentioned receptacle 35, and to prevent them being blown aside plates 53 are attached to the frame and extend forward and back to the elevator-heads.

The machine is propelled by a handle 54, having arms 55 pivoted at 56 to the main frame and extending in a curve up to engage with slots 57 in the top of the frame and back a convenient distance for the operator.

When it is not desired to have the sweeper operate or the machine is to be moved, the brush, with its casing and elevating mechanism, is raised and secured to the handle by hooks 58, engaging with eyes 59 on the casing.

When the receptacle 35 is to be put in place or removed, the handle is thrown forward, as shown in Fig. 3, and the sweeping mechanism raised, which allows easy access for the operation.

The clutch-pinions 11 and the clutch-sprockets 16 are simultaneously thrown into and out of gear by the mechanism shown in Figs. 1 and 2 and in enlarged detail in Fig. 4. The faces of the gear and sprocket hubs are notched, as shown, to receive pins 60 in the ends of the shafts, whereby they are driven. They are normally held in engagement with said pins by the springs 61, pressing outwardly upon the inner faces of the hubs. In order to prevent the turning of the mechanisms in a reverse way when the sweeper is backed up, the notches are beveled, as at 62, so that the pins will force the hub in and out of engagement. In order to throw the mechanisms out of gear, a lever 63 is provided, which is secured at 64 to a shaft 65, journaled in the upright frame members. A rod 66, pivoted to said lever slightly above the point at which it is fulcrumed, extends forward to engage with one arm 67 of the bell-crank 68. The other end of the bell-crank is forked to form a shifter to engage with the grooved hub of the sprocket-wheel. A second rod 69 extends back in a similar manner to engage with a bell-crank 70, forming a shifter for the clutch-pinion 11. The shaft 65, passing across the machine, carries a similar mechanism, whereby the gear and sprocket on the opposite side are operated.

As illustrated in Fig. 3, this invention may be readily transferred into a simple sweeper by removing the forward scraping and elevating mechanism and substituting therefor a supporting-wheel. In a similar manner the sweeping mechanism may be removed and a wheel substituted therefor to enable the front part to be used separately.

I am aware that various changes may be made in the machine which is herein described, and I do not limit myself or deem the invention to be limited to the exact details of construction or arrangements of parts shown; but

What I claim, and desire to secure by Letters Patent, is—

1. In a street-sweeper, a frame mounted on wheels, the combination of a forwardly-extending scraper and elevator, a rearwardly-extending sweeper and elevator, means coacting with the sweeper-wheels for driving said devices and means for throwing said driving apparatus into and out of gear, substantially as described.

2. In combination, a frame mounted on wheels, a forwardly-extending dirt-collecting device, a shaft mounted in said frame for operating said devices, clutch-wheels mounted on said shaft chains or belts connecting said wheels with wheels secured to the bearing-wheels; a rearwardly-extending dust-collecting device, a shaft mounted in the frame for operating said device, clutch-gears mounted on said shaft and engaging with gears on said bearing-wheels a lever secured to a shaft mounted in said frame, rods from said lever to shifters for simultaneously throwing said clutch-wheels and gears out of engagement with pins in the shaft upon which they are mounted, springs for holding said gears and wheels normally in engagement, substantially as described.

3. In combination, a sweeper-frame mounted on wheels, a forwardly-extending dirt-collecting device, a rearwardly-extending dust-collecting device pivotally mounted on said frame, adapted to be raised to admit a receptacle to be secured in said frame between said devices, and a handle for propelling the sweeper pivotally attached to the frame and resting in slots in the upright side members thereof, substantially as described.

PIERRE HAERST.

Witnesses:
H. C. HUNSBERGER,
S. P. MCKELVEY.